United States Patent [19]

Vanassche et al.

[11] 4,243,714
[45] Jan. 6, 1981

[54] STEEL CORD REINFORCEMENT FOR ELASTOMERS AS WELL AS THUS REINFORCED ELASTOMERS

[75] Inventors: Roger Vanassche; Germain Verbauwhede, both of Zwevegem, Belgium

[73] Assignee: N.V. Bekaert S.A., Zwevegem, Belgium

[21] Appl. No.: 902,231

[22] Filed: May 2, 1978

[30] Foreign Application Priority Data

Sep. 30, 1977 [BE] Belgium ............................. 859230

[51] Int. Cl.$^3$ ..................... D03D 13/00; B65G 15/34
[52] U.S. Cl. ................................... 428/258; 198/847; 428/257; 428/259
[58] Field of Search ......... 198/847; 74/231 R, 231 M, 74/231 P, 237; 139/425 R; 428/257, 258, 259

[56] References Cited

U.S. PATENT DOCUMENTS

| 3,205,119 | 9/1965 | Paul | 198/847 X |
| 3,872,735 | 3/1975 | Hnatek | 74/231 R X |
| 3,949,129 | 4/1976 | Hubbard | 139/425 R X |
| 4,019,941 | 4/1977 | Prince et al. | 198/847 X |
| 4,064,915 | 12/1977 | Buyssens et al. | 139/425 R |
| 4,094,402 | 6/1978 | Heeke | 198/847 |

Primary Examiner—James L. Rowland
Attorney, Agent, or Firm—Shlesinger, Arkwright, Garvey and Dinsmore

[57] ABSTRACT

A steel cord reinforcement for elastomers and elastomeric articles comprising a steel cord crimped in a zig-zag fashion used in the warp direction of the reinforcing fabric; the crimps of adjacent warped cords lie in phase, and the wave length p of the crimp and the amplitude c of the crimp are related such that $0.02\ p \leq c \leq 0.07\ p$; to achieve optimal properties of cord elongation and cord deformation, the relationship $S = k\ p^2$ wherein $0.7 \leq k \leq 3$, and the stiffness $S = 10^4 N\ [\Sigma(D_i^4 \times n_i)]$ wherein $D_i$ represents the diameter of wire filament "i" in the cord, $n_i$ is the number of wires "i" per warp cord, and N is the number of warp cords per mm width of the fabric.

6 Claims, 6 Drawing Figures

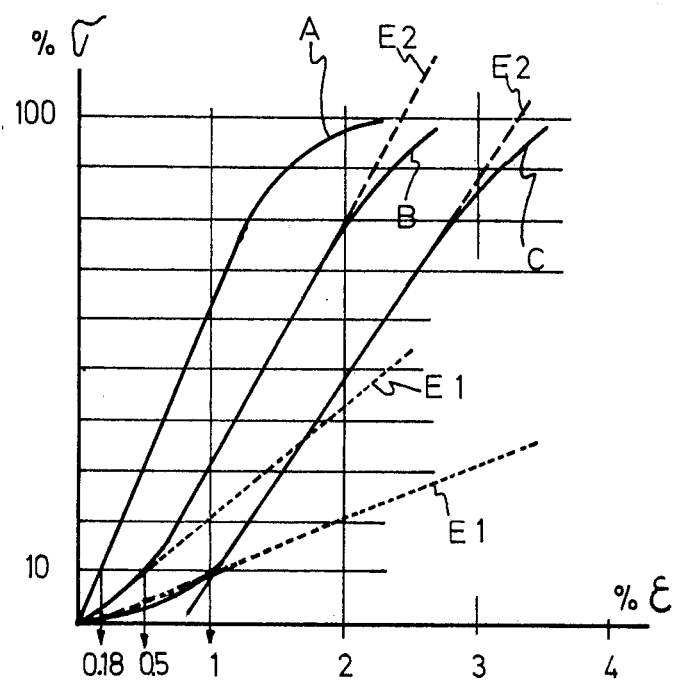
FIG.4
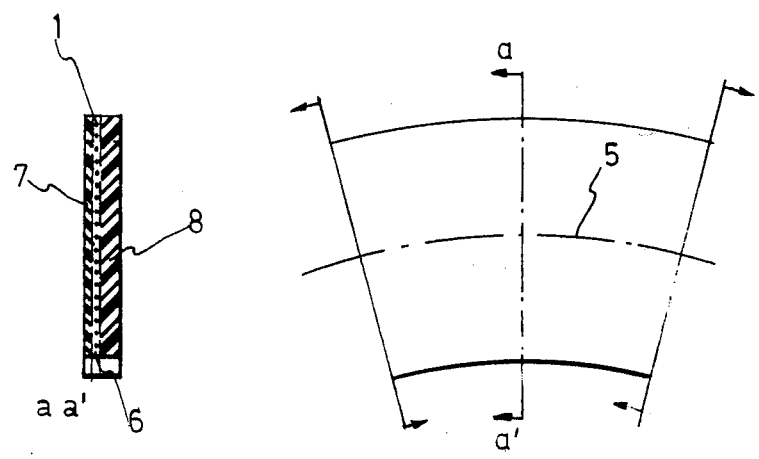
FIG.6
FIG.5

STEEL CORD REINFORCEMENT FOR ELASTOMERS AS WELL AS THUS REINFORCED ELASTOMERS

The present invention relates to steel cord and to a fabric with steel cord warp to reinforce elastomer objects as well as to the thus reinforced objects, particularly conveyor belts. The steel cord, respectively the warp of the fabric is crimped in zig-zag fashion, the crimp thereby being provided in phase in the juxtaposed warp cords.

BACKGROUND AND OBJECTS

To date conveyor belts of reinforced rubber and like materials have been reinforced either with a number of textile fabrics, or with steel wire cables or steel cords provided in the longitudinal direction of the belt. Thereby it is often necessary to provide the textile reinforcement fabrics in a number of layers in order to reach sufficient tensile strength. This generally requires a complicated manufacturing method and apparatus. However, the obtained conveyor belt is rather rigid in the longitudinal direction and turning, respectively driving around drums with a relatively large diameter remains necessary. Moreover, the textile reinforcement is also subjected to a relatively important creep elongation so that it is necessary to tighten the conveyor belt from time to time. The tightening devices require additional space on the conveyor, particularly if used for long conveyor belts. It has already been established for some time that one layer of steel cord or steel cable reinforcement in the longitudinal direction of the conveyor belt suffices to offer the same strength as a multilayer textile reinforcement. See for example British Pat. No. 1,388,785. The conveyor belt is more flexible so that it can be led over small-diameter drums. The creep elongation of steel cord is also much lower. However, it was established that the steel cords must present a structural elongation that is higher than the normal elongation capacity of steel cord to provide the conveyor belt with a given elasticity in normal operating conditions. This requirement was to some extent met by the use of the so-called high-elongation cord, which, however, is an expensive solution.

On the other hand, it is known from the French Pat. No. 1,505,901 to use fabrics with a steel cord warp and plastic weft filaments to reinforce rubber.

It is an object of this invention to provide the steel cords with a suitable elongation capacity by providing the cords mechanically with a zig-zag shape, hereafter called crimp. This solution is more economical than high-elongation cord, particularly since the deformation operation can be carried out in one operation on the preliminarily made steel cord fabric or on the parallel steel cords.

The invention further determines the applicable crimping parameters to obtain a uniform crimp formation without, on the one hand, damaging the steel cords and, on the other, so that the crimped cords have an elongation of 0.3% to 0.8% when loaded to 10% of the steel cord's intrinsic breaking strength.

DESCRIPTION OF THE DRAWINGS

With reference to the accompanying drawings, some embodiments and further advantages of the invention are clarified.

FIG. 4 represents a stress-strain diagram ($\delta$-$\epsilon$) of steel cords crimped according to the invention.

FIG. 5 suggests a laterally deformed conveyor belt section; and

FIG. 6 is a cross section along line aa' of FIG. 5 and viewed in the direction of the arrows.

DESCRIPTION OF THE INVENTION

Figure 1:
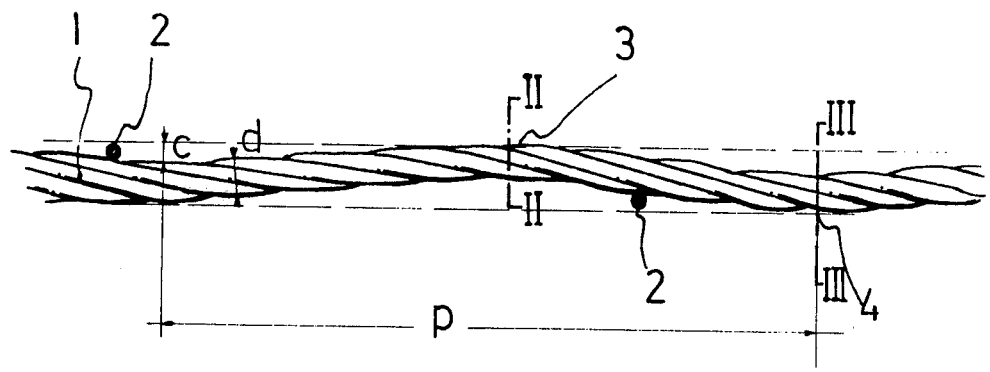
FIG. 1 shows a steel cord (respectively a longitudinal section of a fabric with steel cord warp) which was subjected to a mechanical zig-zag deformation (crimping treatment) according to the invention.

The steel cord (1) illustrated in FIG. 1 which is mechanically crimped according to a zig-zag line has a wave length p and a crimp amplitude c. Between successive crimp crests (3) and crimp troughs (4) the steel cord is substantially linear, so that the crimp may be said to be approximately zig-zag-formed. It has been established experimentally that, in normal working conditions, a reinforced conveyor belt is tensile loaded with a force that is substantially equal to 10% of the breaking strength of the embedded steel cord reinforcement and that in these circumstances the elongation of the conveyor belt must be between 0.3% and 0.8% and preferably even between 0.3% and 0.5%. This is necessary, on the one hand, to keep the tightening stretches of the belt between acceptable limits, and, on the other hand, to efficiently (i.e. without weakening the reinforcing capacity) offset local tensile, compression, or buckling stresses in the belt in case of irregular loading.

To meet the aforementioned elongation requirements, it has now been found that the crimping operation must be carried out in such a manner that the cords in the crimp crests and crimp troughs, are subjected to a slight plastic bending deformation across a bending surface with a curvature radius of at least 1 mm. Furthermore, the obtained crimp amplitude c should, after crimping, meet the equation $0.02p \leq c \leq 0.07p$. The ultimate plastic bending deformation (amplitude c) in the crimp crests and crimp troughs, which is evidently the result of a deeper bending deflection action than the rest amplitude c, should not cause cord damage. Indeed, cord filaments that have been subjected to excessive plastic deformation have a considerably lower strength and fatigue resistance. Also damage of the filament surface, more particularly of the adhesion stimulating coating (e.g. brass) by local pressure and friction between the cord and the crimping elements in the crimping areas must be avoided. The deformation stresses in a loaded reinforced object are indeed highest near the crimp crests and troughs. Reduced adhesion in these crimping areas will therefore rapidly initiate local degradations in the reinforced object and it is possible that after some time corrosion of the steel cord reinforcement will start in these critical areas so that the reinforcing capacity would decrease. The pressure and friction forces applied by the crimping elements on the cords must therefore remain under a threshold value.

According to the invention the crimping parameters are selected in such a way that optimal elongation characteristics are combined with an optimal cord deformation. The required deformation force to be applied on the cord or fabric is evidently governed by the nature of the cords, i.e. diameter and construction: the number of wire filaments, the thickness of the filaments and to a lesser extent their mutual arrangement (lay length, core-sheath configuration with a possible opposite torsion or twist direction of core and sheath, etc.). It has been established that apart from meeting the relation between p and c, the following relation between p and the cross stiffness S of the uncrimped fabric (or of the adjacent cords without weft connection) must be met to combine the abovementioned optimal properties of cord elongation and cord deformation: $S=kp^2$ with $0.7 \leq k \leq 3$. The stiffness S in N.mm is very well approximated by the calculated value $10^4 N[\Sigma(D_i^4 \times n_i)]$ wherein $D_i$ represents the diameter of wire filament "i" in the cord, $n_i$ the number of wires "i" per warp cord and N the number of warp cords per mm width of the fabric. In the strength range ST 200 to ST 2000 for conveyor belts, the required strength can be obtained with steel cords with diameters d ranging between 0.5 mm and 3 mm. The number of cords N per mm of fabric width varies thereby between 0.25 and 1 cords. However, k will preferably be taken between 0.8 and 1.5. A further preferable embodiment advances narrower limits for c, viz.

$$0.03p \leq c \leq 0.05p.$$

Figure 2:
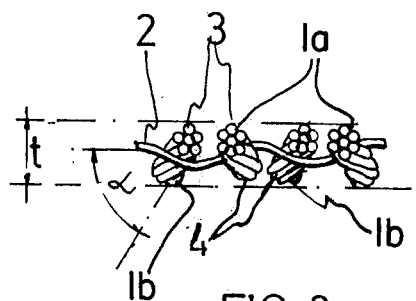
FIG. 2, respectively
Figure 3:
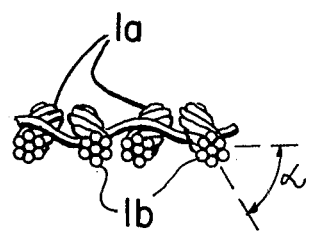
FIG. 3, are schematic cross-sectional views of the crimp crests, respectively the crimp troughs of a crimped steel cord fabric. The adjacent warp cords hereby alternately have an S lay and a Z lay.

When the steel cord reinforcing structure is in the form of a fabric (steel cord in the warp), then the warp cords may have a twist either in the S direction, or in the Z direction. However, to obtain a torsion stability in the fabric, it is recommendable to use alternately cords with Z lay and cords with S lay. Yet it was established that, when crimping the fabric perpendicularly to the fabric surface, the plane formed by the zig-zag crimp is not always perpendicular to the fabric plane but inclined through an angle $\alpha$ between 30° and 90° to the fabric plane, as shown in FIG. 2. Cords with different lays (1a), resp. (1b), will also be inclined in opposite directions. This inclination will depend upon, amongst other things, on the cord construction. If cords are used, in which the core wire or core strand and the sheath wires or sheath strands have the same lay, then the angle $\alpha$ will generally be smaller than in the opposite case. This particular fabric structure in which ideally the crimp crests (3) of each cord lie near the crimp crests (3) of one of the adjacent cords and the crimp troughs (4) near the crimp troughs (4) of the other adjacent cord, offers several further advantages. In the first place, the thickness t of the fabric is smaller due to this inclination of the cords. This is advantageous to the longitudinal flexibility. Furthermore, the cross-stiffness is somewhat improved, however without impeding the trough formation of the reinforced belt.

The main role of the weft of the fabric is to provide the fabric with a certain cross-stability. Monofilaments or yarns made of synthetic material, e.g. nylon, polyester or Kevlar ®, either round with a diameter between 0.2 mm and 0.6 mm, say 0.4 mm, or with a rectangular cross-section of say 0.25 mm to 0.5 mm have proved suitable as to, on the one hand, strength and elasticity, and, on the other, as to thickness. Indeed, the thickness of the weft threads should therefore not be too great in order not to disturb the regularity of the crimp formation. If desired, a coating stimulating the adhesion to rubber or a similar elastomer may be applied on the weft thread. The mutual distance between successive weft threads is preferably approximately equal to p.

The advantages of the crimped fabric have become evident particularly through their embedment in the rubber during the manufacture of conveyor belts. The conventional methods and machines for making conveyor belts reinforced with textile fabrics (calendering) have proved to be suitable for the incorporation of the crimped steel cord fabric according to the invention. Processing is simple since one layer of steel cord reinforcement is sufficient. Because of their zig-zag shape, the warp cords take up easily local axial compression stresses and thus offset any local stress differences produced during the processing of the belt (calendering, vulcanizing, cooling down). In this respect, their performance is at least as good as that of high-elongation cord. Due to the fact that the embedded cords have a substantial elongation capacity when tensile loaded under 10% of their breaking strength, the conveyor belt will also take up local stresses more easily, for instance at uneven loading, at local impact loads (stones falling on the belt, objects that get stuck between the supporting rollers and the belt, etc.). At 10% of the breaking load of the steel cords, the conveyor belt generally still has an elongation between 0.2% and 0.6%.

EXAMPLE 1

A fabric of brass coated steel cord in the warp and with a $(3+9) \times 0.28$ construction (core strand of 3 wires with each a diameter of 0.28 mm envelopped by 9 sheath wires with the same diameter and with a polyester filament with a cross section 0.4 mm in the weft was subjected to a crimping treatment according to the invention. The fabric contained 0.64 cords per mm of fabric width and was incorporated in a conveyor belt of the ST 1000 strength class. The adjacent warp cords alternately had a Z lay and an S lay. The crimp deformation was continuously applied by running the fabric in the warp direction between a couple of toothed rollers. The stiffness S per mm of fabric width was calculated with the formula $S = EI(\text{N.mm}) = 9810 D^4 \times n \times N$ wherein D=0.28 mm, n=12 and N=0.64. So the calculated stiffness value S was 463 N.mm. With a selected value of k=1.16, $S=kp^2$ gave a value for p of 20 mm. To obtain a suitable elongation of approximately 0.5% on the crimped fabric at 10% of the breaking load of the uncrimped fabric, a crimp amplitude was selected of c=0.8 mm (c=0.04p). After crimping the fabric, it appeared that the applied crimping deformation (to reach a rest amplitude c=0.8 mm at p=20 mm) had caused no cord damage. The breaking load of the crimped cords was e.g. still higher than 95% of the breaking load of the uncrimped cords. In the crimping areas no places were found where the brass coating was pushed or rubbed away. So it may be concluded that the applied forces were under the threshold value.

It is known that the strength of steel cord slightly rises owing to the vulcanization of the rubber matrix. However, damaged steel cords cause the strength to decrease during vulcanization. This is a further reason to prevent damage during the deformation treatment.

Another interesting feature of the crimped steel cords resides in the fact that they present a relatively low modulus $E_1$ when stress loaded at forces below 10% of their breaking load ($\delta$, 100%) (which stresses correspond with their normal working conditions) and that their modulus rises to the amount $E_2$ when the cords are submitted to higher elongation forces. This is clearly seen in FIG. 4 wherein curve A represents the stress-strain behavior of a noncrimped steel cord, whereas curve B shows this behavior of the cord crimped according to the present example (c=0.04p) and curve C shows the stress-strain relation of a crimped cord with c=0.06p. This feature is due to the fact that the crimp is already straightened out to a certain extent when stress loaded above 10% of its breaking load. A temporary overloading of the belt (over 10% of the breaking strength of the steel cord fabric) will thus not cause an excessive elongation of the belt due to the presence of the high modulus $E_2$ in that range. Further advantages of this feature clearly appear on the one hand during processing of the conveyor belt and on the other hand during operation of the belt in various conditions.

The fabric crimped according to the example (c=0.04p) was calendered into a type of rubber (6) that possesses a good adhesion to brass-coated steel cord (see FIG. 5). A top coating (8) of 6 mm thickness with a good abrasion resistance and an underlayer (7) with a thickness t=2 mm, substantially equal to the thickness of the crimped fabric, were applied in successive calendering steps. After being cut to the suitable belt width, the whole was fed into the vulcanization press.

The obtained conveyor belt was smooth and straight over its entire length. The lateral stiffness of the conveyor belt (i.e. its deformation when subjected to a bending moment in its surface plane so that its longitudinal axis (5) is curved as illustrated in FIG. 5) was lower than that of a belt reinforced with uncrimped cords because the cords take up axial compression and tensile stresses more easily. Indeed they must not buckle; a change in crimp amplitude and wave length p sufficiently takes up axial stress differences. Another consequence is that the conveyor belt (even though it would be slightly oblique in unstressed condition) will always run straight and true on the rollers of the conveyor. This is important, particularly for long length belts and in view of easy troughing.

The belt was further cyclically stress loaded between 10% and 2% of the intrinsic breaking strength of the steelcord fabric during 30 min. (40 cycles). No creep elongation was observed after this test, i.e. the belt, under the above mentioned stress load of 2%, was not longer than before the test and under the same stress load. It was also observed that the elongation of the belt at a 10% load (as set hereinbefore) was about 0.35%, whereas the elongation of the reinforcing fabric itself amounted to 0.5%.

EXAMPLE 2

A fabric of brass coated steel cord in the warp (N=0.59) and with a construction 0.30+6×0.25 (core wire with a diameter of 0.30 mm surrounded by 6 wires with each a diameter of 0.25 mm—cord diameter d=0.8 mm) and with a polyester filament (diameter 0.4 mm) as weft (0.7 pics per cm) was crimped as described in example 1 with a wave length p=12 mm and c=0.05p=0.6 mm. In the relation $k=10^4 \cdot N \cdot \Sigma(D_i^4 \cdot n_i)/p^2$ was found $k=10^4 \times 0.59 \times [(0.30)^4 + 6 \times (0.25)^4]/12^2 = 1.29$. The fabric had a strength of 55 N/mm (ST 500 class) and presented an elongation of 0.55% when stress loaded at 55 N/mm. The adjacent warp cords had alternatively an S lay and a Z lay and cord damage was observed neither in the crimp crests nor in the crimp troughs.

The cord construction used in this example offered a very good penetration for the adhesion rubber (6) between its filaments. This favours its anchoring effect into the belt. The underlayer (7) of rubber had a thickness of 2 mm and the upper layer (8) had a thickness of 5 mm. The total belt thickness was 8.5 mm. Conventional textile reinforced belts in the same strength range generally have a thickness of 10.5 mm.

EXAMPLE 3

For a belt in the strength range ST 800 a crimped fabric was used with the following parameters:

cord construction 3×0.20 mm+6×0.35 mm: brass coated and offering good penetration to the adhesion rubber between is filaments. The core strand (3×0.20) had a twist opposite to that of the surrounding wires (6×0.35);

N=0.53; p=20 mm and c=0.7 mm; d=1.13 mm;

from $k=10^4 N\Sigma(D_i^4 \times n_i)/p^2$ was derived k=1.25;

weft: polyester filament with diameter 0.4 mm and coated with a conventional adhesion promoting substance to rubber;

adjacent warp cords with alternate torsion S resp. Z;

curvature radius of the crimping teeth of the gear rollers were 3 mm.

The cords were not damaged during the crimping treatment and the fabric presented an elongation of 0.56% when loaded at 10% of the intrinsic breaking strength 832.1 N/mm of the non-crimped fabric.

Although the invention was specifically clarified with regard to the reinforcement of rubber conveyor belts it is obvious that variant applications of the described embodiment are possible. First of all, there is the reinforcement of polyvinyl chloride (P.V.C.) conveyor belts, where the invention can also be applied. Hereby it will be of particular interest to select a suited P.V.C. composition that possesses a good adhesiveness to steel cords, e.g. a P.V.C.-resin that includes an epoxy resin component; or to use a laminated structure with an elastomer core layer reinforced with a fabric according to the invention and sandwiched between P.V.C. layers presenting good adhesion to the rubber core layer or optionally to an intermediate anchoring layer between the rubber and P.V.C.

The crimped fabric may also be used as a reinforcement in driving belts or hoses. The crimped cords may also be provided in the cross direction of the belt whenever extra transverse strength is required, e.g. to counteract longitudinal cuts in the conveyor belt. This and other variants are considered to fall within the scope of the described invention.

We claim:

1. A fabric for reinforcing rubber or elastic materials comprising zig-zag crimped steel cord in the warp direction wherein the crimps of adjacent warp cords lie in phase and within the wavelength p of the crimp deformation and the crimp amplitude c are defined by $0.02p \leq c \leq 0.07p$, and wherein k meets the relationship $0.7 \leq k \leq 3$ in the expression $10^4 N[\Sigma D^4 \times n_i] = kp^2$ with $D_i$ being the diameter of wires i, $n_i$ being the number of wires i per warp cord and N being the number of warp cords per mm width of the fabric and wherein the steel cord diameter d is chosen between 0.5 mm and 3 mm and wherein $0.25 \leq N \leq 1$, the curvature radius of the zig-zag warp cords being at least 1 mm in the crimp crests and troughs, and adjacent warp cords being twisted alternately in S-direction and Z-direction.

2. A fabric according to claim 1 whereby $0.8 \leq k \leq 1.5$, whereas $0.03p \leq c \leq 0.05p$.

3. A fabric according to claim 1 wherein the plane formed by the zig-zag formed crimp of each warp cord forms an angle $\alpha$ between 30° and 90° to the plane formed by the fabric.

4. A fabric according to claim 1 whereby the crimp crests (3) of each cord (1a) lie near the crimp crests (3) of one of the adjacent cords (1b) and the crimp troughs (4) of the same cord (1a) lie near the crimp troughs (4) of the other adjacent cord (1b).

5. A fabric according to claim 1 wherein the weft thread (2) is a monofilament with a thickness between 0.2 mm and 0.6 mm.

6. A fabric according to claim 5 whereby the weft thread (2) has a coating for promoting the adhesion of the thread to the rubber.

* * * * *